(12) United States Patent
Mukohara (10) Patent No.: US 10,197,131 B2
(45) Date of Patent: Feb. 5, 2019

(54) POWER UNIT (71) Applicant: HONDA MOTOR CO., LTD., Tokyo (JP)

(72) Inventor: Hodaka Mukohara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 24 days.

(21) Appl. No.: 15/440,219

(22) Filed: Feb. 23, 2017

(65) Prior Publication Data
US 2017/0276212 A1 Sep. 28, 2017

(30) Foreign Application Priority Data

Mar. 28, 2016 (JP) .................................. 2016-063189

(51) Int. Cl.
| | |
|---|---|
| *F16F 15/26* | (2006.01) |
| *F01M 1/02* | (2006.01) |
| *F01P 3/02* | (2006.01) |
| *F01P 5/12* | (2006.01) |

(52) U.S. Cl.
CPC ............. *F16F 15/264* (2013.01); *F01M 1/02* (2013.01); *F01P 3/02* (2013.01); *F01P 5/12* (2013.01); *F01M 2001/0253* (2013.01); *F01M 2001/0269* (2013.01); *F01P 2003/021* (2013.01); *F01P 2003/024* (2013.01)

(58) Field of Classification Search
CPC .... F16F 15/264; F01P 3/02; F01P 5/12; F01P 2003/021; F01P 2003/024; F01M 1/02; F01M 2001/0253; F01M 2001/0269
See application file for complete search history.

(56) References Cited

U.S. PATENT DOCUMENTS

| | | | | |
|---|---|---|---|---|
| 5,314,319 A | * | 5/1994 | Nilsson | F01M 1/02 418/133 |
| 6,508,211 B1 | * | 1/2003 | Asano | F01P 7/16 123/41.1 |
| 9,964,011 B2 | * | 5/2018 | Mukohara | F01M 11/03 |
| 2003/0037752 A1 | * | 2/2003 | Nomura | F02B 61/02 123/192.2 |
| 2008/0022981 A1 | * | 1/2008 | Keyaki | F01M 13/04 123/574 |
| 2008/0060606 A1 | * | 3/2008 | Inui | F01M 11/02 123/196 A |

(Continued)

FOREIGN PATENT DOCUMENTS

| | | | | |
|---|---|---|---|---|
| JP | 04209928 A | * | 7/1992 | ............ F02B 75/22 |
| JP | 04209929 A | * | 7/1992 | ............ F02B 75/22 |
| JP | 2009-121325 A | | 6/2009 | |

*Primary Examiner* — Joseph Dallo
(74) *Attorney, Agent, or Firm* — Squire Patton Boggs (US) LLP (57) ABSTRACT

In a vehicle power unit having an internal combustion engine, a pair of power transmission gears for transmitting rotation of a crank shaft to a balancer shaft is arranged between a crankcase and a crankcase cover, and a fluid pump is provided on a power transmission gear shaft supporting a power transmission gear, by which the backlash between the crank shaft and the balancer shaft is reduced and the friction and the noise of the gears are restrained while achieving downsizing of the gears of the crank shaft and the balancer, weight reduction and downsizing of the power unit.

5 Claims, 11 Drawing Sheets

(56) References Cited

U.S. PATENT DOCUMENTS

| | | | |
|---|---|---|---|
| 2010/0186706 A1* | 7/2010 | Okada | F01M 9/06 123/192.2 |
| 2010/0243349 A1* | 9/2010 | Nomura | B60K 6/40 180/65.31 |
| 2011/0247581 A1* | 10/2011 | Trieschmann | C22C 37/04 123/192.2 |
| 2014/0174385 A1* | 6/2014 | Kisaichi | F01M 1/02 123/41.44 |

* cited by examiner

POWER UNIT

TECHNICAL FIELD

The present invention relates to a power unit for a vehicle to which auxiliary machinery is attached.

BACKGROUND ART

Vehicle power units having a conventional balancer mechanism include a type in which a drive gear provided on a crank shaft and a driven gear on a balancer shaft directly engage with each other and transmit rotary driving force from the crank shaft to the balancer shaft (see Patent Document 1).

This type of power units have a problem in that backlash noise occurs between the drive gear and the driven gear arranged between the crank shaft and the balancer shaft when fluctuation occurs in the rotation of the crank shaft in a state with increased backlash due to temperature variations accompanying the operation of the power unit. Further, in cases of using layout structure with a long interval between the crank shaft and the balancer shaft, problems arise in that the drive gear and the driven gear are required to increase in diameter and weight. This causes the crankcase to be enlarged outward, and the power unit to be increased in size.

PRIOR ART DOCUMENT

Patent Document

[Patent Document 1]
JP 2009-121325 A

SUMMARY OF THE INVENTION

Problems to be Solved by the Invention

The object of the present invention, which has been made to overcome the above-described problems, is to provide a power unit for a vehicle capable of restraining the occurrence of the backlash noise between the drive gear and the driven gear arranged between the crank shaft and the balancer shaft, eliminating the weight increase by downsizing the drive gear of the crank shaft and the driven gear of the balancer, achieving downsizing of the crankcase by reducing outward protrusion of the crankcase, and achieving downsizing of the entire power unit by compact arrangement of auxiliary machinery provided around the balancer.

Means for Solving the Problems

To solve the above problems, the present invention provides a power unit for a vehicle comprising: a crankcase, a cylinder body having a cylinder therein, and a cylinder head successively stacked up and mounted on the vehicle; a crank shaft provided in the crankcase to be oriented in a vehicle width direction; a balancer shaft provided in the crankcase to be oriented in the vehicle width direction; and a crankcase cover arranged on one side of the crankcase; the crank shaft and the balancer shaft being arranged one in front of the other in the crankcase;

wherein a pair of power transmission gears for transmitting rotation of the crank shaft to the balancer shaft is arranged between the crankcase and the crankcase cover, the power transmission gears being supported on power transmission gear shafts, respectively; and a fluid pump is provided on one of the power transmission gear shafts to be driven thereby.

In the power unit according to the present invention, the pair of power transmission gears for transmitting the rotation of the crank shaft to the balancer shaft is arranged between the crank shaft and the balancer shaft, and the fluid pump is provided on a power transmission gear shaft of a power transmission gear as one of the pair of power transmission gears. Therefore, transmission of the rotational fluctuation of the crank shaft to the balancer shaft is reduced by rotational resistance of the fluid pump provided on the shaft of one of the power transmission gears. Accordingly, reduction of the backlash between the crank shaft and the balancer shaft is made possible and the noise caused by the backlash can be reduced.

Further, by arranging the pair of power transmission gears between the crank shaft and the balancer shaft to transmit power, even in cases of using layout structure with a long interval between the crank shaft and the balancer shaft, gear wheels provided on the crank shaft and the balancer shaft can be downsized, weight reduction and downsizing of the crankcase are made possible, and the entire power unit can be downsized.

In a preferred form of the invention, the balancer shaft has thereon a balancer gear in mesh with one of the power transmission gears, and the one power transmission gear and the balancer gear are arranged to overlap with each other in a vertical direction; and the other of the power transmission gears is arranged above a line connecting a rotational center of the crank shaft and a rotational center of the one power transmission gear as viewed in a direction of a crank shaft axis line.

With the above configuration, the one power transmission gear and the balancer gear are arranged to vertically overlap with each other and the other power transmission gear is arranged above the line connecting the rotational center of the crank shaft and the rotational center of the first power transmission gear. Therefore, the crankcase can be downsized in the longitudinal direction (forward and backward direction), and especially, a joining surface between the crankcase and the crankcase cover can be downsized. This also makes it possible to form small-sized bosses, for supporting gear shafts of the two power transmission gears, on both the crankcase and the crankcase cover and to stably support the gear shafts at both ends.

In a preferred form of the invention, the one power transmission gear shaft, on which the fluid pump is provided, is rotatable integrally with the one power transmission gear; a fluid channel is formed in the crankcase, the cylinder body and the cylinder head, to lead a fluid delivered from the fluid pump to circumference of the cylinder in the cylinder body (3) and to the cylinder head; the fluid channel has a fluid intake port; the fluid pump has a discharge port; and the discharge port of the fluid pump and the fluid intake port of the fluid channel are arranged to overlap with each other as viewed in the direction of the crank shaft axis line.

With the above configuration, the discharge port of the fluid pump and the fluid intake port of the fluid channel can be arranged close to each other. Thus, shortening of the fluid channel from the crankcase to the circumference of the cylinder makes it possible to downsize the power unit and increase the pump efficiency of the fluid pump.

In a further preferred embodiment of the invention, the power unit includes fastening members that joins the crankcase, the cylinder body, and the cylinder head together; the fluid channel includes a cylinder circumferential channel formed to surround the cylinder and an inflow channel connecting the fluid intake port and the cylinder circumferential channel; and the inflow channel is connected to the cylinder circumferential channel at a side of an exhaust valve provided for the cylinder, while bypassing or detouring one of the fastening members.

With the above configuration, low-temperature fluid supplied from the fluid pump can be sent directly to the side of the exhaust valve heated to increased temperature while bypassing or detouring the fastening member. Therefore, the cylinder's circumference on the side of the exhaust valve, needing strong cooling effect, is cooled down effectively and the improvement in the coolability of the internal combustion engine enables prevention of abnormal combustion and improvement in the engine performance.

In a still further preferred embodiment of the invention, the fluid pump is a water pump; the crank shaft is provided with a drive gear rotatable integrally with the crank shaft; the water pump is configured to be driven by the drive gear via the pair of power transmission gears; and an oil pump is provided to be driven by the drive gear via a two-stage intermediate gear made up of a first reduction gear and a second reduction gear.

With the above configuration, due to the sharing of the drive gear for the driving of the water pump and the driving of the oil pump, increase in the axial length of the crank shaft can be prevented and the power unit can be downsized.

Effects of the Invention

The power unit according to the present invention is capable of restraining the backlash noise between the drive gear and the driven gear arranged between the crank shaft and the balancer shaft, eliminating the weight increase by downsizing the drive gear of the crank shaft and the driven gear of the balancer, achieving the downsizing of the crankcase by reducing the outward protrusion of the crankcase, and achieving the downsizing of the entire power unit by compact arrangement of the auxiliary machinery provided around the balancer.

MODE FOR CARRYING OUT THE INVENTION

A power unit according to an embodiment of the present invention will be described below with reference to the drawings. A power unit 1, including a transmission (not depicted) arranged integrally on the rear of an internal combustion engine E, is a power unit mounted on a motorcycle not depicted in the drawings. In the present embodiment, forward, rearward, leftward, and rightward directions are defined according to the common standard defining the forward direction as the direction of straight traveling of the motorcycle equipped with the power unit of the present embodiment. In the drawings, FR indicates the forward direction or the front side, RR indicates the rearward direction or the rear side, LH indicates the leftward direction or the left-hand side, and RH indicates the rightward direction or the right-hand side.

Figure 1:
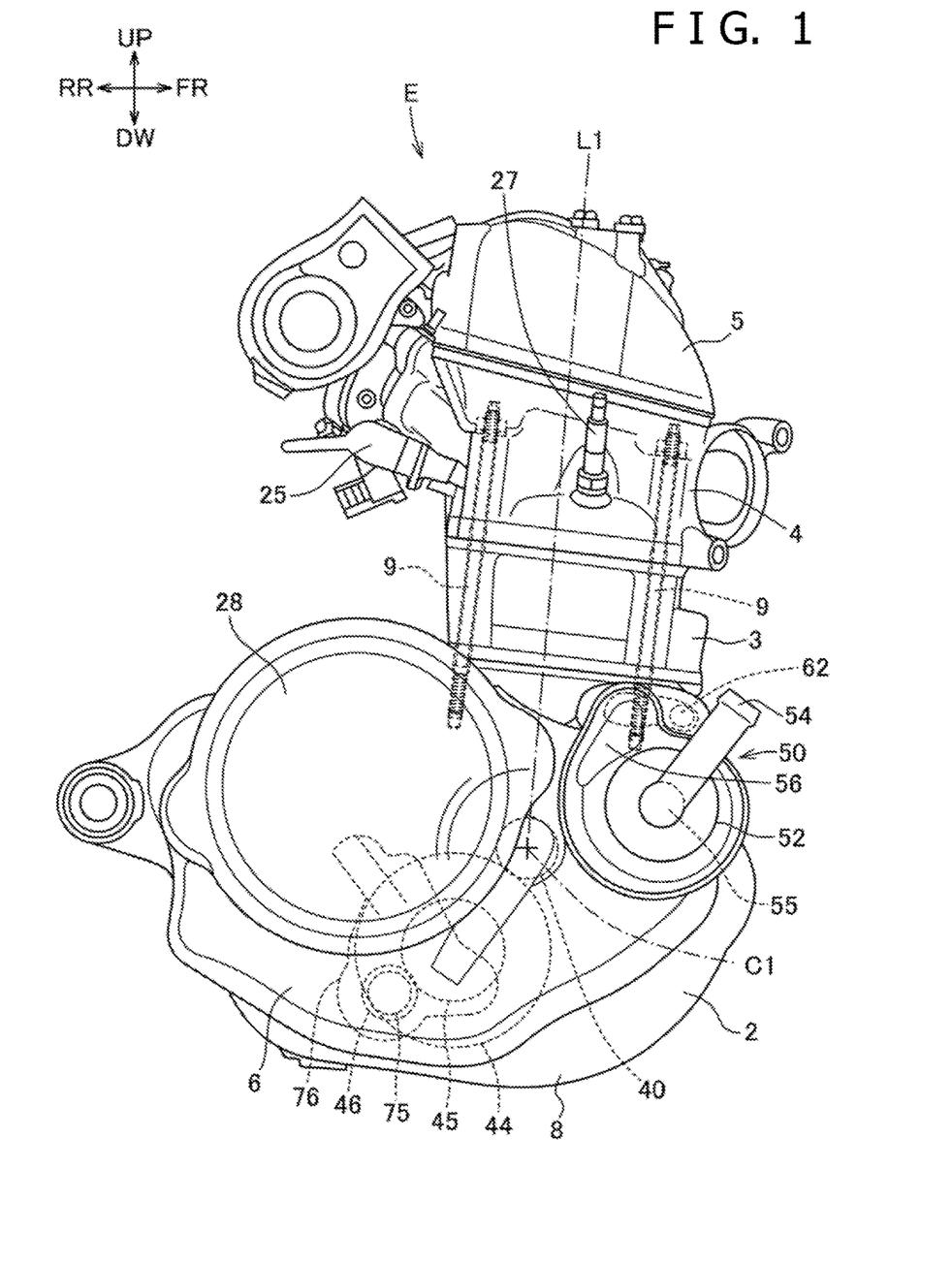
FIG. 1 is a left side view depicting a power unit according to an embodiment of the present invention.

The power unit 1 according to the embodiment of the present invention employs a water-cooled, single-cylinder and four-stroke internal combustion engine E. As depicted in FIG. 1, the power unit 1 includes a crankcase 2 that are separated into the right and left into two crankcase sections 2a and 2b (see FIG. 7). On the crankcase 2, a cylinder body 3 including the cylinder and a cylinder head 4 are successively stuck up and fastened integrally by using stud bolts 9. The top of the cylinder head 4 is covered with a cylinder head cover 5. Right and left side faces of the crankcase 2 are covered with a right case cover 6 and a left case cover 7 (FIG. 7) serving as crankcase covers. At the bottom of the crankcase, an oil pan 8 is formed integrally. A clutch cover 28 covering a clutch C and a water pump cover 52 constituting a part of a water pump 50 are attached to the outer surface of the right case cover 6. The power unit 1 is mounted on the motorcycle (not depicted) with its crank shaft 30 oriented in a vehicle width direction and with a cylinders axis line L1 slightly leaned forward.

Figure 2:
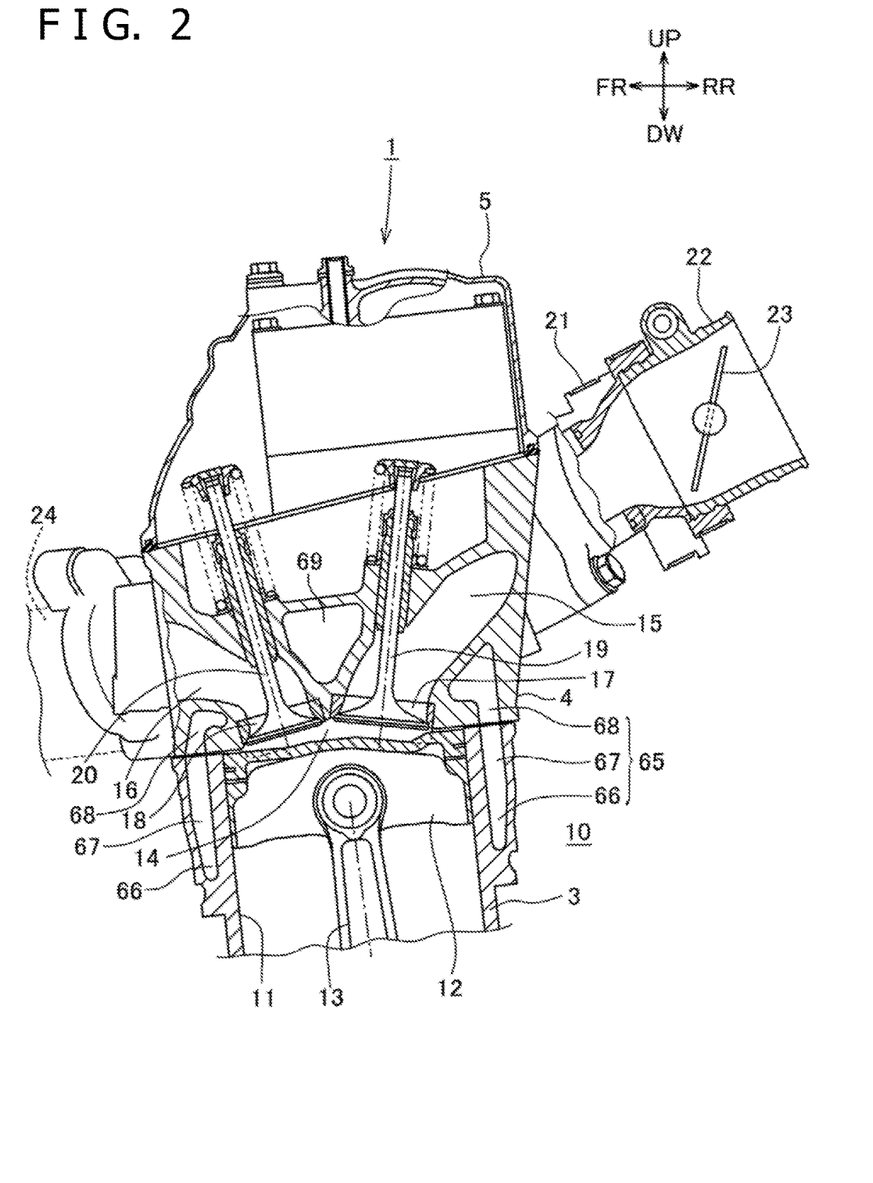
FIG. 2 is an enlarged vertical sectional view depicting a principal part of the power unit.

As depicted in FIG. 2, a single cylinder 10 is formed in the cylinder body 3, in which is formed a cylinder bore 11 penetrating the cylinder 10 in the vertical direction. A piston 12 is fitted in the cylinder bore 11. The piston 12 is connected via a connecting rod 13 to a crank pin (not depicted) of the crank shaft 30 rotatably supported by the crankcase 2.

The crank shaft 30 is provided with a pair of crank webs (not shown) situated on both sides of the crank pin.

A combustion chamber 14 is formed between the cylinder head 4 and the piston 12. The cylinder head 4 is provided with an intake port 15 and an exhaust port 16. The intake port 15 connects to the combustion chamber 14 via a pair of intake valve bores 17, while the exhaust port 16 connects to the combustion chamber 14 via a pair of exhaust valve bores 18. Intake valves 19 and exhaust valves 20 for respectively opening and closing the intake valve bores 17 and the exhaust valve bores 18 are also arranged on the cylinder head 4. The intake valves 19 and the exhaust valves 20 are opened and closed with prescribed timings by a valve moving device (not depicted) arranged in the cylinder head cover 5.

An intake pipe 21 and an exhaust pipe 24 are connected to the intake port 15 and the exhaust port 16, respectively. As depicted in FIG. 1, a fuel injection valve 25 for injecting fuel into the intake port 15 is provided in the intake pipe 21 so that the fuel injected from the fuel injection valve 25 and air taken in through the intake port 15 are mixed together and sent to the inside of the combustion chamber 14.

As depicted in FIG. 2, a throttle body 22 including a throttle valve 23 of the butterfly type is connected to the intake pipe 21. Since the throttle body 22 is formed in a tapered shape with its inner diameter gradually decreasing towards the intake pipe 21, swirls in a low load region of the internal combustion engine E tend to be produced and combustion efficiency increases.

Figure 3:
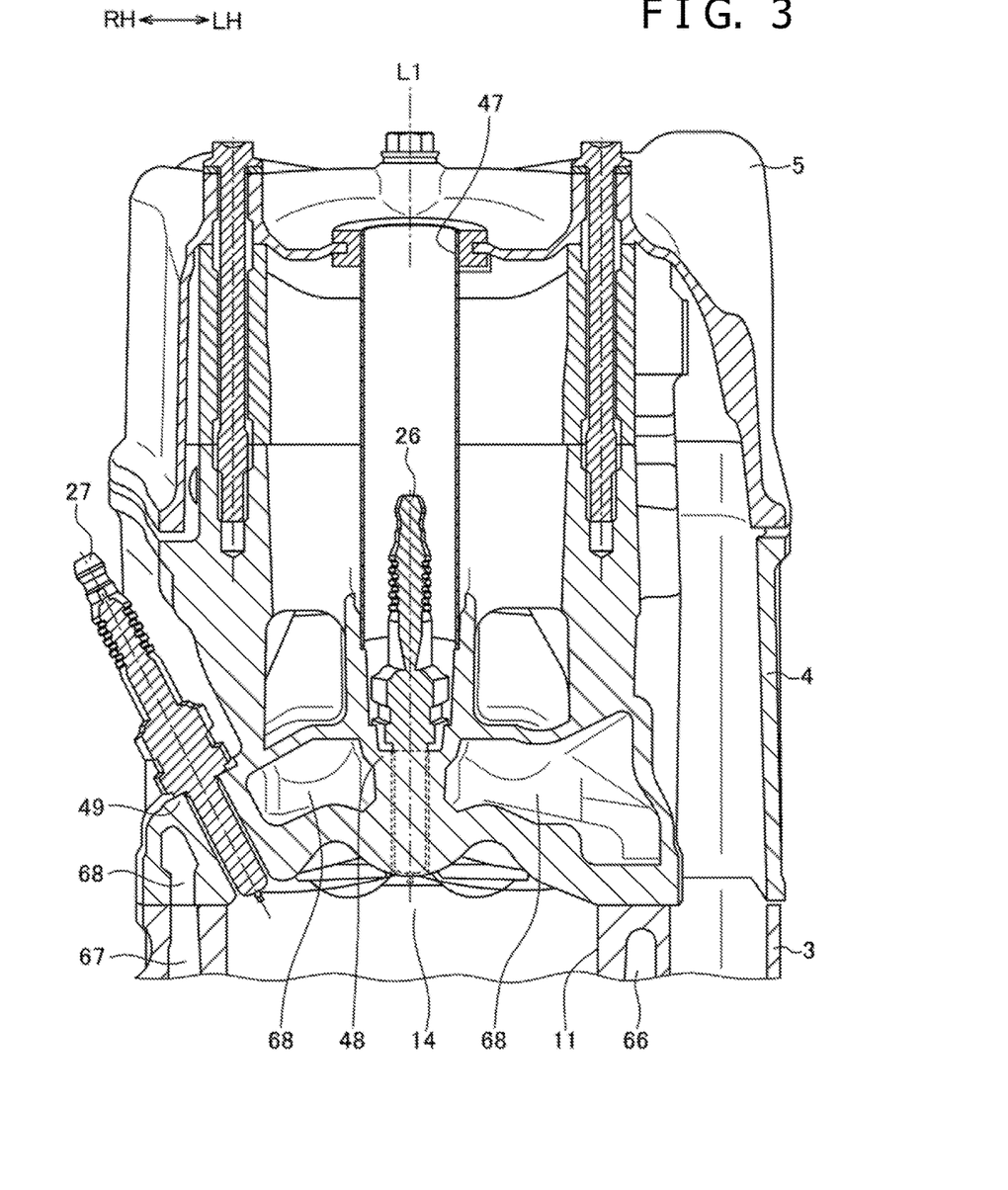
FIG. 3 is an enlarged vertical sectional view depicting a principal part of the power unit cut along a cylinder axis line while omitting an intake valve and an exhaust valve.

As depicted in FIG. 3, two spark plugs for igniting the air-fuel mixture are screwed into the cylinder head 4. One first spark plug 26 is inserted into a spark plug tube 47 from above the combustion chamber 14 in the direction of the cylinder axis line L1. On the other hand, another second spark plug 27 is inserted from the right-hand side of the cylinder head 4. The cylinder head 4 is provided with a first spark plug boss seat 48 and a second spark plug boss seat 49. The first spark plug 26 and the second spark plug 27 are respectively screwed into the first spark plug boss seat and the second spark plug boss seat 49 and thereby attached to the cylinder head 4 to reach the combustion chamber 14. Combustion energy in the combustion chamber 14 of the internal combustion engine E is converted into kinetic energy of the piston 12. The piston 12 moving up and down rotationally drives the crank shaft 30 via the connecting rod 13.

Figure 4:
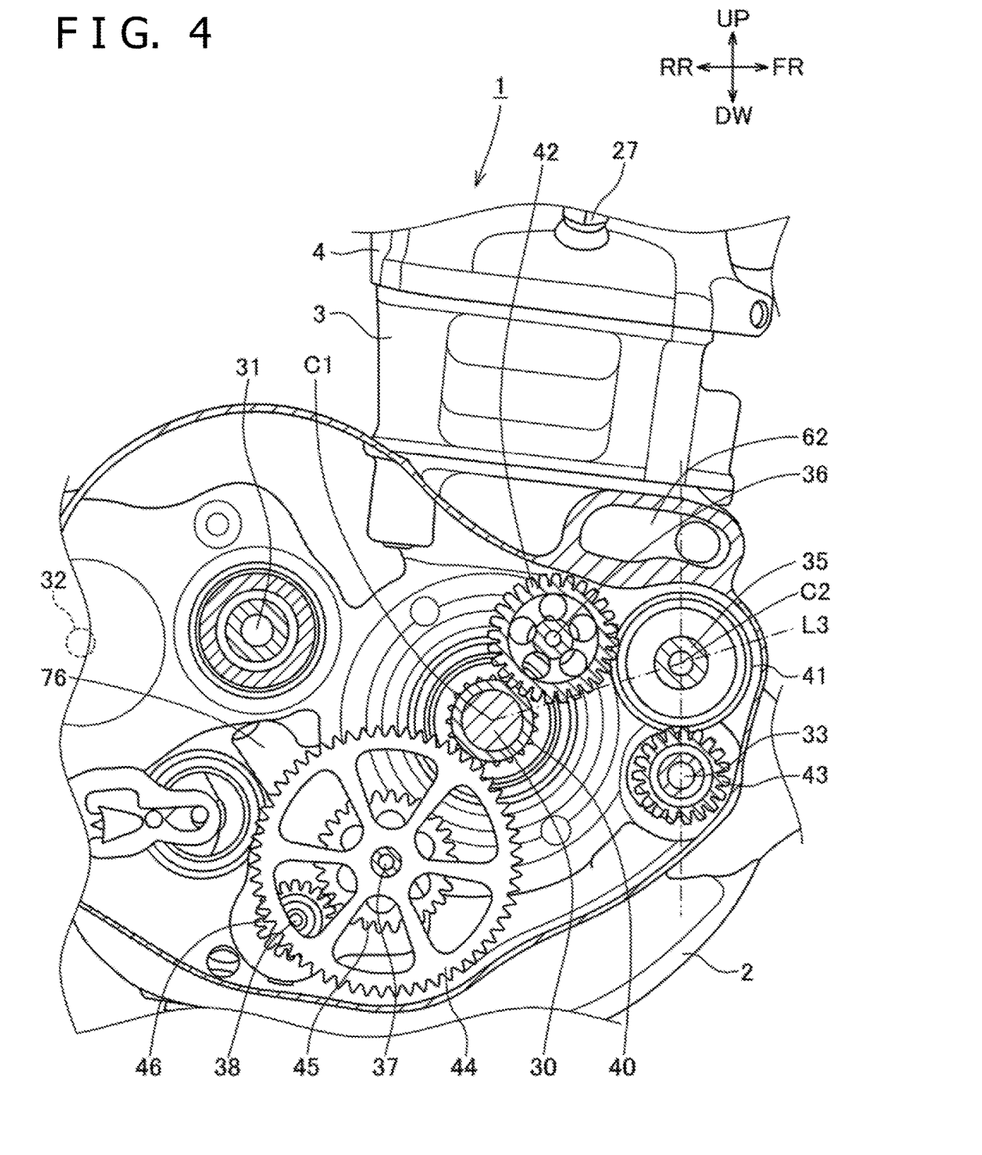
FIG. 4 is a right side view of the power unit partially cut vertically.
Figure 5:
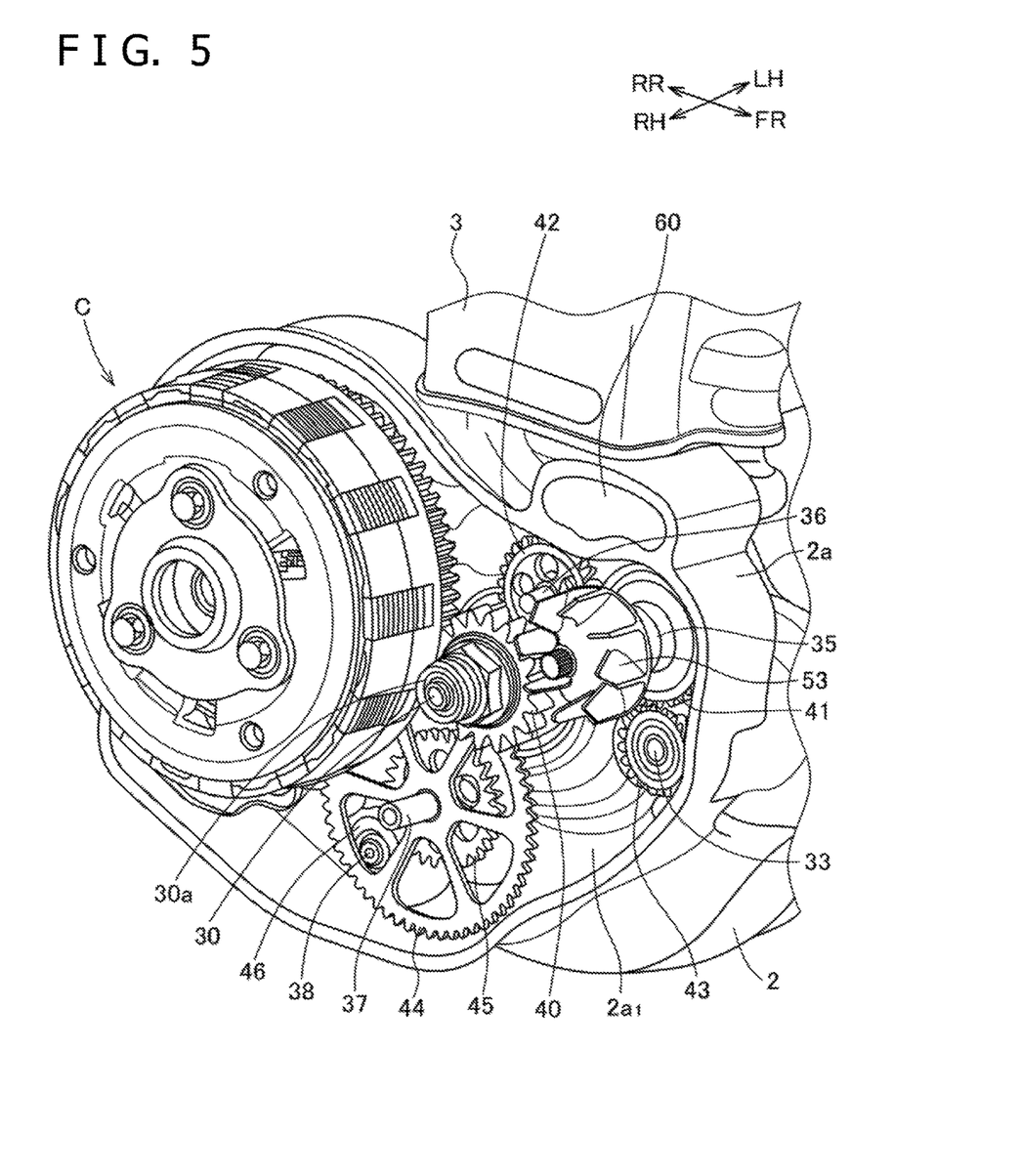
FIG. 5 is a perspective view of the power unit without a right case cover.

FIG. 4 is a view depicting a state in which a part of the power unit is cut vertically. FIG. 5 is a perspective view of the power unit 1 without the right case cover. The crank shaft 30, a main shaft 31, and a counter shaft 32 are arranged in the crankcase 2 with their axis lines in parallel with each other and are rotatably supported by bearings (not depicted) on right and left crankcase sections 2a and 2b. Rotary driving force of the crank shaft 30 is transmitted to the main shaft 31 via the clutch C capable of connecting and disconnecting power transmission, and further to the counter shaft 32 via a transmission mechanism (not depicted).

Figure 7:
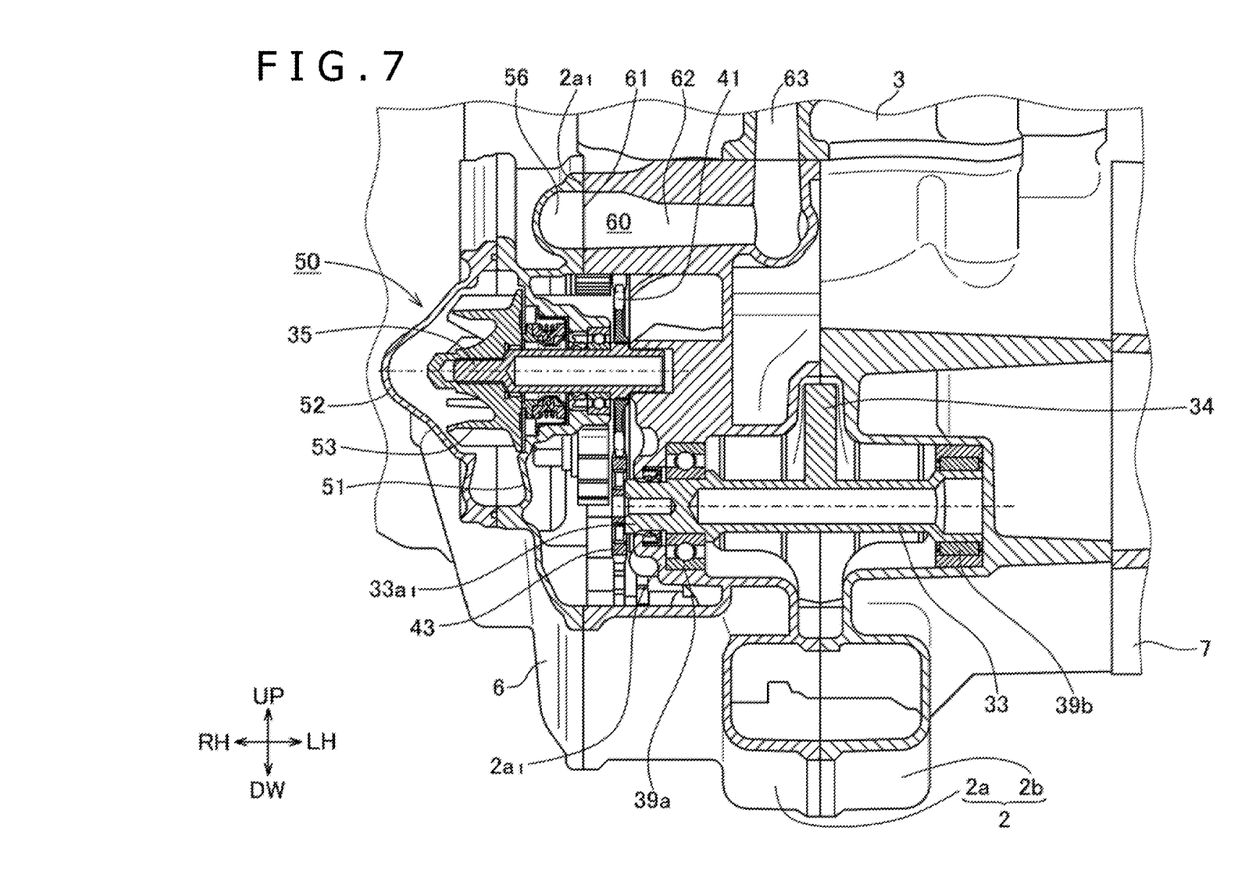
FIG. 7 is a cross-sectional view of the power unit taken along a plane passing through an axis line of a first power transmission gear shaft and an axis line of a balancer shaft.

In the crankcase 2, a balancer shaft 33 is arranged in front of the crank shaft 30 to be in parallel with the crank shaft 30. As depicted in FIG. 7, the balancer shaft 33 is rotatably supported by the right and left crankcase sections 2a and 2b via right and left bearings 39a and 39b, respectively. A balancer weight 34 is provided approximately at the center of the balancer shaft 33 in regard to its axial direction. The balancer shaft 33 is arranged so that the center of the balancer weight 34 in the width direction thereof coincides with the separation plane between the crankcase sections 2a and 2b.

As depicted in FIG. 5, a right end part 30a of the crank shaft 30 protrudes outward from a right side wall $2a_1$ of the right crankcase section 2a. A drive gear 40 is attached to the right end part 30a so as to rotate integrally with the crank shaft 30. As depicted in FIG. 7, a right end part $33a_1$ of the balancer shaft 33 protrudes outward from the right side wall $2a_1$ of the right crankcase section 2a. A balancer gear 43 is attached to the right end part $33a_1$ so as to rotate integrally with the balancer shaft 33.

As shown in FIG. 4, a pair of power transmission gears 41 and 42 for transmitting the rotation of the crank shaft 30 to the balancer shaft 33 is provided between the crank shaft 30 and the balancer shaft 33. The pair of power transmission gears 41 and 42 is made up of a first power transmission gear 41 and a second power transmission gear 42. The first power transmission gear 41 and the second power transmission gear 42 are respectively attached to a first power transmission gear shaft 35 and a second power transmission gear shaft 36 rotatably supported by the right case cover 6 so as to rotate integrally with the first power transmission gear shaft 35 and the second power transmission gear shaft 36.

The first power transmission gear 41 is arranged directly above the balancer gear 43 to overlap with the balancer gear 43 in the vertical direction. Meanwhile, the second power transmission gear 42 is arranged above a line L3 connecting a rotational center C1 of the crank shaft 30 and a rotational center C2 of the first power transmission gear 41 as viewed from the right side (as viewed in a direction of a crank shaft axis line L2). The first power transmission gear 41 and the second power transmission gear 42 are disposed between the right crankcase 2a and the right case cover 6 as depicted in FIG. 7. The first and second power transmission gears 41 and 42 are positioned somewhat within the right crankcase 2a in the embodiment shown.

The first power transmission gear 41 is in meshing engagement with both the balancer gear 43 and the second power transmission gear 42. The second power transmission gear 42 is in meshing engagement with both the first power transmission gear 41 and the drive gear 40. The rotary driving force of the crank shaft 30 is transmitted successively to the drive gear 40, the second power transmission gear 42, the first power transmission gear 41, and the balancer gear 43 in this order, by which the balancer shaft 33 is rotated. The numbers of cogs of the drive gear 40, the balancer gear 43, the first power transmission gear 41, and the second power transmission gear 42 are set so that the crank shaft 30 and the balancer shaft 33 rotate in synchronization with each other. Primary vibration of the piston 12 is damped by the balancer weight 34.

In the pair of power transmission gears 41 and 42, the first power transmission gear 41 is provided thereon with the water pump 50 serving as a fluid pump as depicted in FIG. 7. The first power transmission gear shaft 35 serves as a water pump shaft.

Further, as depicted in FIG. 1, an oil pump 75 is arranged below and to the rear of the crank shaft 30. As FIG. 5 shows, the power is transmitted from the crank shaft 30 to an oil pump gear 46 via the drive gear 40 and intermediate gears made up of a first reduction gear 44 and a second reduction gear 45, and thus the oil pump 75 is driven by the drive gear 40. The oil pump 75 is covered with an oil pump cover 76 that is attached to the right crankcase 2a.

Figure 6:
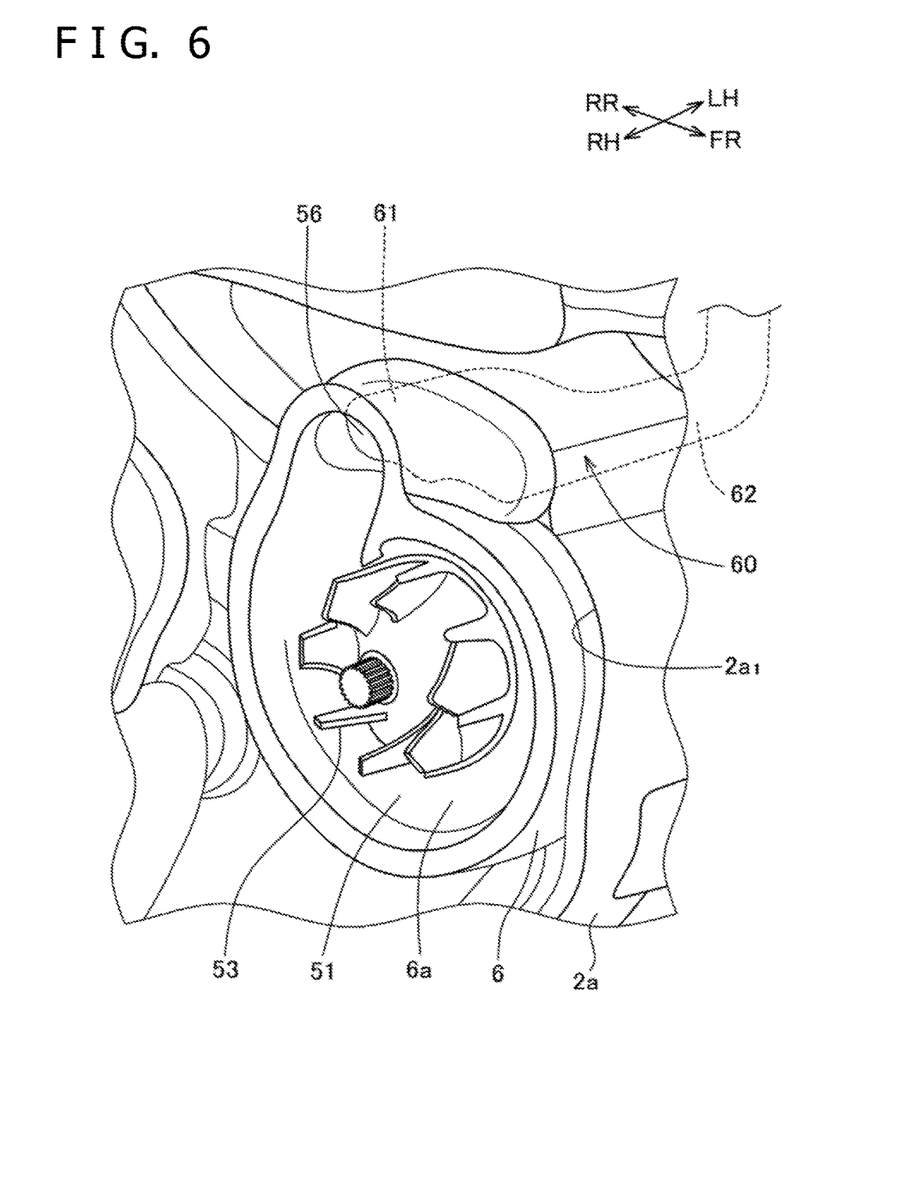
FIG. 6 is a perspective view around a water pump with a water pump cover removed from the right case cover.
Figure 8:
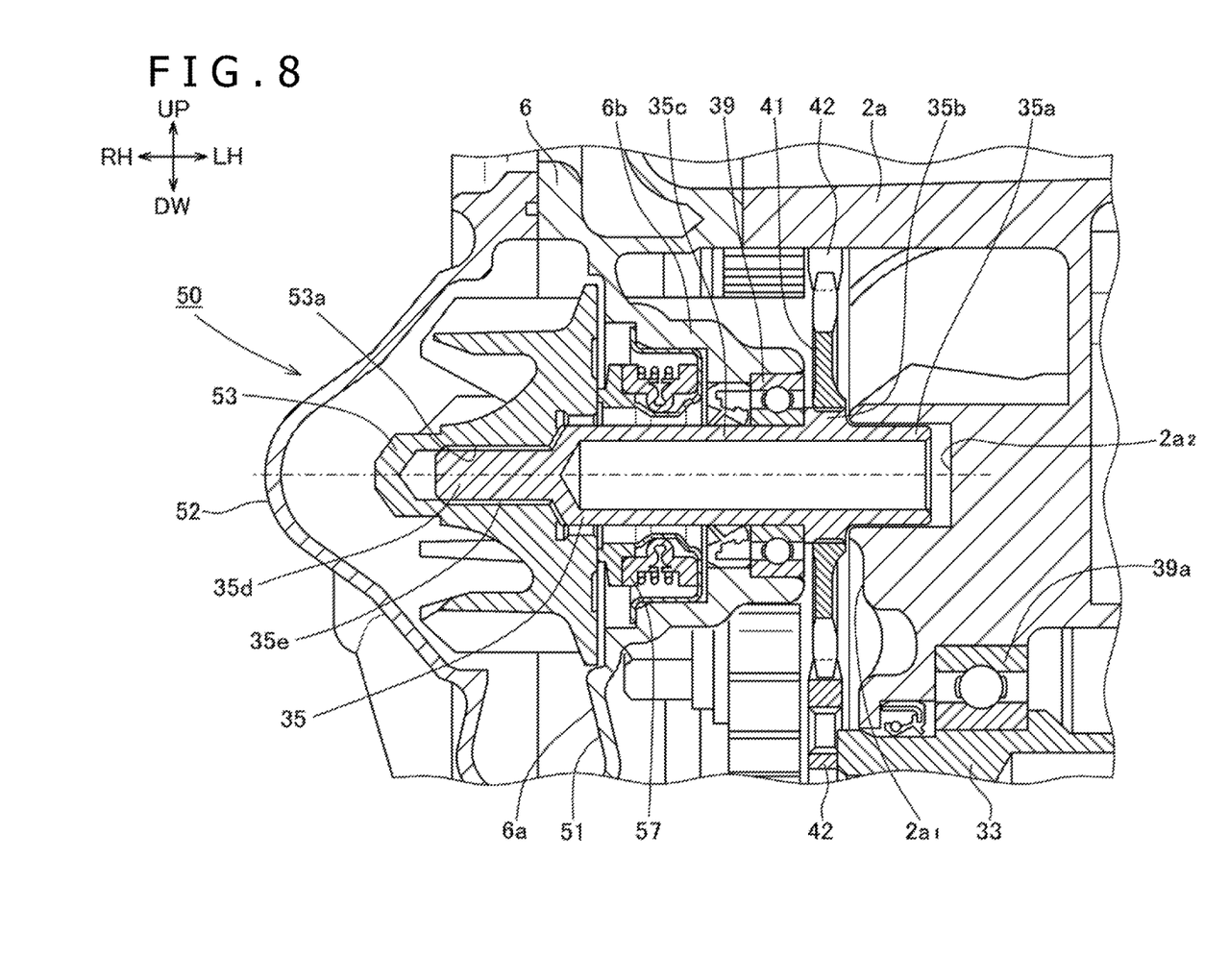
FIG. 8 is an enlarged cross-sectional view around an oil pump depicted in FIG. 7.

As depicted in FIGS. 6 and 8, the water pump cover 52 of the water pump 50 is attached to a water pump case half 51 formed on a right wall 6a of the right case cover 6. The water pump case half 51 and the water pump cover 52 constitute the case of the water pump 50.

As depicted in FIG. 8, the first power transmission gear shaft 35, with its left end part 35a fitted in a recess $2a_2$ formed on the right crankcase section 2a, is rotatably supported by the right crankcase section 2a. An intermediate part 35c of the first power transmission gear shaft 35 is rotatably supported via a bearing 39 by a water pump attachment boss part 6b that is formed on the right case cover 6 to protrude towards the right crankcase section 2a. The first power transmission gear shaft 35 is held at both ends thereof and supported stably by bosses formed on the right crankcase section 2a and the right case cover 6.

An enlarged-diameter part 35b having an enlarged diameter is formed between the left end part 35a and the intermediate part 35c of the first power transmission gear shaft 35. The first power transmission gear 41 is fitted onto the large-diameter part 35b. Thus, the first power transmission gear shaft 35 and the first power transmission gear 41 rotate integrally with each other.

A right end part 35d of the first power transmission gear shaft 35 protrudes rightward from the right case cover 6. A threaded part 35e is formed on the right end part 35d. An impeller 53 is attached to the first power transmission gear shaft 35 by screwing a screw hole 53a of the impeller 53 onto the threaded part 35e. The threaded part 35e of the right end part 35d and the screw hole 53a of the impeller 53 are formed as reverse threads with respect to the direction of rotation of the impeller 53, and thus the impeller 53 does not come off from the first power transmission gear shaft 35 even when the impeller 53 is rotationally driven by the first power transmission gear shaft 35.

Figure 11:
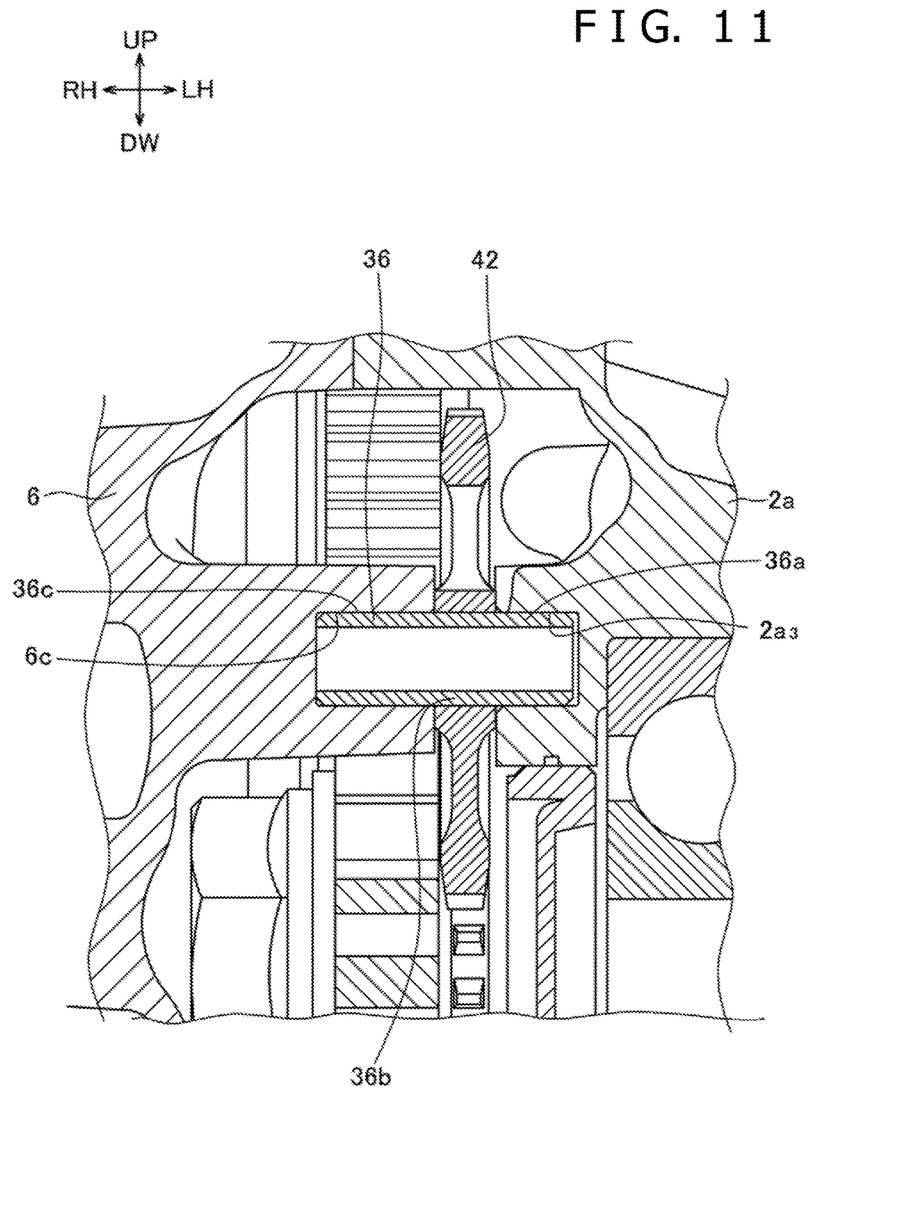
FIG. 11 is a vertical sectional view of a principal part of the power unit around a second power transmission gear shaft taken along a vertical plane passing through an axis line of the second power transmission gear shaft.

As depicted in FIG. 11, the second power transmission gear shaft 36, with its left end part 36a fitted in a recess $2a_3$ formed in the right crankcase section 2a and its right end part 36c fitted in a recess 6c formed in the right case cover 6, is rotatably supported by the right crankcase section 2a and the right case cover 6. The second power transmission gear 42 is fitted onto an intermediate part 36b of the second power transmission gear shaft 36, and thus the second power transmission gear shaft 36 and the second power transmission gear 42 rotate integrally with each other.

The water pump cover 52 is provided with an inlet pipe 54 as depicted in FIG. 1. Cooling water sent from a radiator (not depicted) to the inlet pipe 54 is fed from the inlet pipe 54 to the inside of the casing of the water pump 50 via an inlet port 55, fed under pressure by the impeller 53, and sent out from a discharge port 56 to a cooling water channel 60 shown in FIG. 5.

Figure 9:
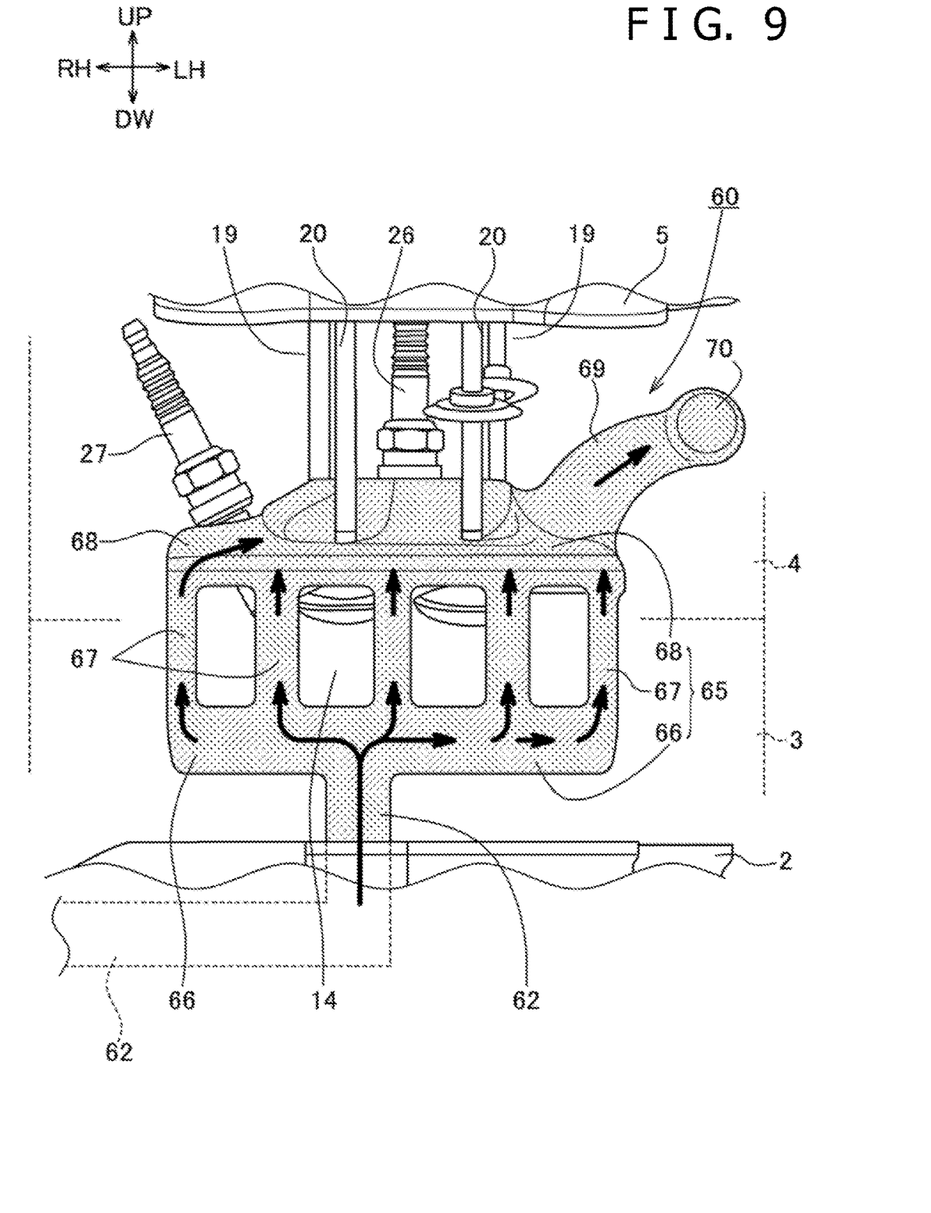
FIG. 9 is a schematic diagram depicting a cooling water channel viewed from the front while omitting a cylinder body and a cylinder head.

As depicted in FIGS. 2, 6, and 9, the cooling water channel 60 is formed across the crankcase 2, the cylinder body 3, and the cylinder head 4 and serves as a fluid channel for leading the cooling water delivered from the water pump 50 to the circumference of the cylinder 10 provided in the cylinder body 3 and the cylinder head 4.

As depicted in FIGS. 6 and 7, a cooling water intake port 61 for taking the cooling water into the cooling water channel 60 is open on the right side wall $2a_1$ of the right crankcase section 2a. The cooling water intake port 61, formed at a position overlapping with the discharge port 56 of the water pump 50 as viewed in the direction of the crank shaft axis line L2, is connected to the discharge port 56 of the water pump 50. The cooling water sent out from the water pump 50 is fed into the cooling water channel 60 for cooling the cylinder 10.

As depicted in FIG. 9, the cooling water channel 60 includes an inflow channel 62 through which the cooling water taken in from the cooling water intake port 61 flows, a cylinder circumferential channel 65 formed to connect with the inflow channel 62 and surround the circumference of the cylinder 10, a discharge channel 69 connected to the cylinder circumferential channel 65, and a discharge port 70.

Figure 10:
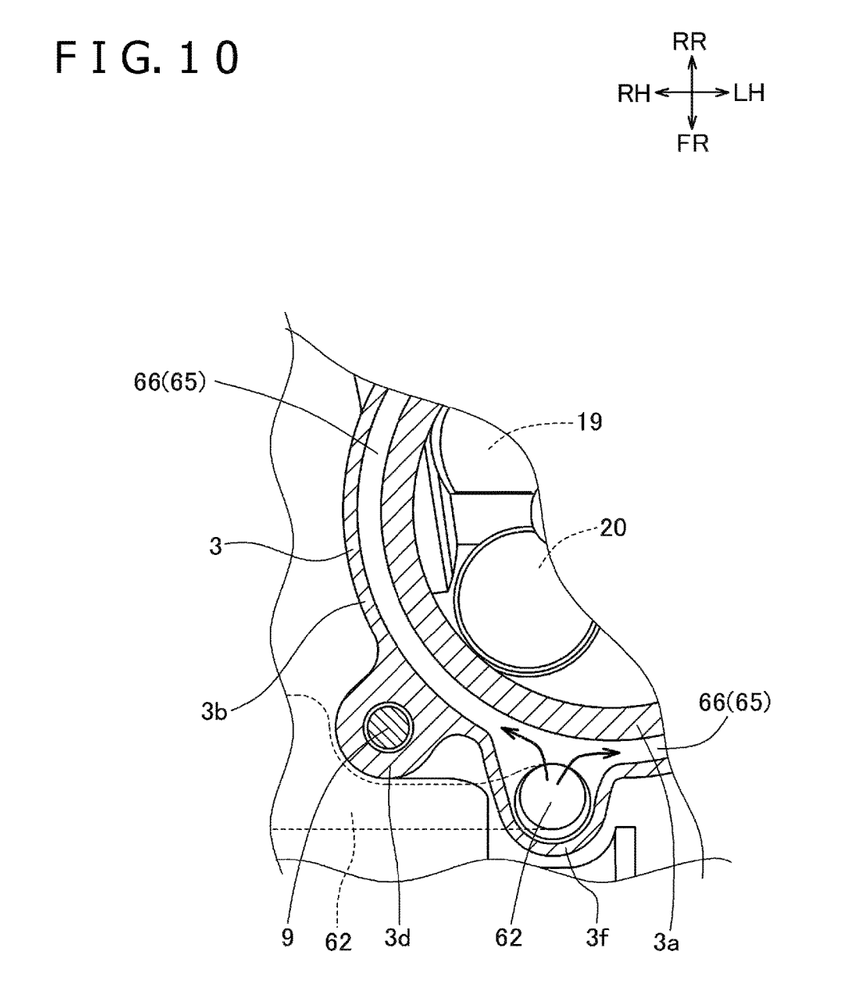
FIG. 10 is a horizontal sectional view of a principal part of the power unit taken along a plane orthogonal to the cylinder axis line and passing through a lower part of the cylinder body.

As FIG. 10 shows, the inflow channel 62 bypasses or extends to avoid the stud bolt 9 and is connected to the cylinder circumferential channel 65 in the regions of the exhaust valves 20 on the front side of the cylinder circumferential channel 65.

As depicted in FIG. 9, the cylinder circumferential channel 65 includes a lower channel 66 formed to surround the circumference of a lower part of the cylinder 10, an upper channel 68 formed in the cylinder head 4 to surround an upper part of the combustion chamber 14, and a plurality of middle channels 67 extending in the direction of the cylinder axis line L1 to connect the lower channel 66 and the upper channel 68. From the left-hand side of the upper channel 68, the discharge channel 69 extends leftward. The discharge port 70 is formed at the left end of the discharge channel 69.

As shown in FIG. 10, the cylinder body 3 includes a cylinder inner wall part 3a formed to surround the cylinder bore 11 and a cylinder outer wall part 3b formed to surround the cylinder inner wall part 3a. The lower channel 66 and the middle channels 67 of the cylinder circumferential channel 65 are formed between the cylinder inner wall part 3a and the cylinder outer wall part 3b. Stud bolt boss parts 3d into which the stud bolts 9 are inserted are formed at four corners of the cylinder outer wall part 3b. The inflow channel 62 bypasses or detour one of the four stud bolt boss parts 3d situated at the right front corner and is connected to the lower channel 66, on the side of the exhaust valve 20, of the lower channel 66 of the cylinder circumferential channel 65 at the front side of the lower channel 66.

Since the inflow channel 62 is connected to the lower channel 66, on the side of the exhaust valve 20, of the cylinder circumferential channel 65 while bypassing or detouring the stud bolt boss part 3d, low-temperature fluid supplied from the water pump 50 can be sent directly to the circumference of the cylinder 10 on the side of the exhaust valve 20 heated to higher temperature. Therefore, the circumference of the cylinder 10 on the side of the exhaust valve 20, needing strong cooling effect, is cooled down effectively, and the improvement in the coolability of the internal combustion engine E enables prevention of abnormal combustion and improvement in the engine performance.

The cooling water delivered from the water pump 50 and passed through the cooling water channel 60 is discharged from the discharge port 70, then sent to the radiator via a cooling water hose (not depicted), and cooled down by the radiator.

The power unit 1 of the present embodiment is configured as described above. Accordingly, the following effects are achieved.

The power unit 1 according to the embodiment of the present invention includes the crank shaft 30 mounted on the vehicle to be oriented in the vehicle width direction, the crankcase 2, the cylinder body 3, and the cylinder head 4 that are successively stacked up, and the case covers 6 and 7 arranged on the two sides of the crankcase 2, respectively. Further, the crank shaft 30 and the balancer shaft 33 are arranged one in front of the other in the crankcase 2. The pair of power transmission gears 41 and 42 for transmitting the rotation of the crank shaft 30 to the balancer shaft 33 is arranged between the crank shaft 30 and the balancer shaft 33. The water pump 50 is provided on the first power transmission gear shaft 35 of the first power transmission gear 41 as one of the pair of power transmission gears 41 and 42. Therefore, even when the rotation of the crank shaft 30 fluctuates, the rotation of the crank shaft 30 can be transmitted to the balancer shaft 33 while reducing the fluctuation by rotational resistance of the water pump 50 provided on the first power transmission gear 41, and the backlash noise between the crank shaft 30 and the balancer shaft 33 can be reduced.

Further, by arranging the pair of power transmission gears 41 and 42 between the crank shaft 30 and the balancer shaft 33 to transmit power, even in cases of using layout structure with a long interval between the crank shaft 30 and the balancer shaft 33, the gear wheels of the drive gear 40 provided on the crank shaft 30 and the balancer gear 43 provided on the balancer shaft 33 can be downsized, weight reduction and downsizing of the crankcase 2 become possible, and the entire power unit 1 can be downsized.

Further, the first power transmission gear 41, as one of the pair of power transmission gears 41 and 42, and the balancer gear 43 are arranged to overlap with each other in the vertical direction, the first power transmission gear 41 is in meshing engagement with the balancer gear 43, and the second power transmission gear is arranged above the line L3 connecting the rotational center C1 of the crank shaft 30 and the rotational center C2 of the first power transmission gear as viewed in the direction of the crank shaft axis line L2. Therefore, the crankcase 2 can be downsized in the longitudinal direction (forward and backward direction), and especially, a joining surface between the crankcase 2 and the right case cover 6 can be downsized. This also makes it possible to form small-sized bosses, for supporting the first power transmission gear shaft 35 and the second power transmission gear shaft 36, on both the crankcase 2 and the right case cover 6 and to stably support the first power transmission gear shaft 35 and the second power transmission gear shaft 36 at both ends.

Furthermore, the water pump 50 is provided on the first power transmission gear shaft 35, the cooling water channel 60 for leading the fluid delivered from the water pump 50 to the circumference of the cylinder 10 in the cylinder body 3 and the cylinder head 4, is formed in the crankcase 2, the cylinder body 3, and the cylinder head 4. In addition to this, the cooling water intake port 61 to the cooling water channel 60 and the discharge port 56 of the water pump 50 are arranged to overlap or coincide with each other as viewed in the direction of the crank shaft axis line L2. As a result, the discharge port 56 of the water pump 50 and the cooling water intake port 61 of the cooling water channel 60 can be arranged close to each other. Shortening of the cooling water channel 60 from the crankcase 2 to the circumference of the cylinder 10 makes it possible to downsize the power unit 1 and increase the pump efficiency of the water pump 50.

Moreover, the power unit 1 includes the stud bolts 9 that join the crankcase 2, the cylinder body 3, and the cylinder head 4 together, the cooling water channel 60 includes the cylinder circumferential channel formed to surround the cylinder 10 and the inflow channel 62 connecting the cooling water intake port 61 and the cylinder circumferential channel 65, and the inflow channel 62 is connected to the side of the exhaust valve 20 of the cylinder circumferential channel 65 while bypassing or detouring the stud bolt 9. Therefore, low-temperature fluid supplied from the water pump 50 can be sent directly to the side of the exhaust valve 20, heated to an increased temperatures, the cylinder 10 on side of the exhaust valve 20 needing strong cooling effect is cooled down effectively, and the improvement in the coolability of the internal combustion engine E enables prevention of abnormal combustion and improvement in the engine performance.

In addition, the crank shaft 30 is provided with the drive gear 40 rotating integrally with the crank shaft 30, the water pump 50 is operated by the drive gear 40 via the pair of power transmission gears 41 and 42, and the oil pump 75 is driven by the drive gear 40 via the two-stage intermediate gear made up of the first reduction gear 44 and the second reduction gear 45. Therefore, thanks to the sharing of the drive gear 40 for the driving of the water pump 50 and the driving of the oil pump 75, increase in the axial length of the crank shaft 30 can be prevented and the power unit 1 can be downsized.

While the embodiment of the present invention has been described in detail above, the present invention is not to be restricted by the above-described embodiment and a variety of modifications are possible. The power unit 1 according to the present invention is not limited to power units of motorcycles but is widely applicable to other kinds of vehicles of the saddle-riding type.

DESCRIPTION OF REFERENCE SYMBOLS

1 . . . Power unit, 2 . . . Crankcase, 3 . . . Cylinder body, 4 . . . Cylinder head, 6 . . . Right case cover, 7 . . . Left case cover, 9 . . . Stud bolt, 10 . . . Cylinder, 20 . . . Exhaust valve, 30 . . . Crank shaft, 33 . . . Balancer shaft, 35 . . . First power transmission gear shaft, 36 . . . Second power transmission gear shaft, 40 . . . Drive gear, 41 . . . First power transmission gear, 42 . . . Second power transmission gear, 43 . . . Balancer gear, 48 . . . First spark plug boss seat, 49 . . . Second spark plug boss seat, 50 . . . Water pump, 60 . . . Cooling water channel, 61 . . . Cooling water intake port, 62 . . . Inflow channel, 65 . . . Cylinder circumferential channel, 75 . . . Oil pump, C1 . . . Rotational center of crank shaft, C2 . . . Rotational center of first power transmission gear, E . . . Internal combustion engine, L1 . . . Cylinder axis line, L2 . . . Crank shaft axis line, L3 . . . Line connecting rotational center of crank shaft and rotational center of first power transmission gear.

The invention claimed is:

1. A power unit for a vehicle comprising:
a crankcase, a cylinder body having a cylinder therein, and a cylinder head successively stacked up and mounted on the vehicle;
a crank shaft provided in the crankcase to be oriented in a vehicle width direction;
a balancer shaft provided in the crankcase to be oriented in the vehicle width direction; and
a crankcase cover arranged on one side of the crankcase;
the crank shaft and the balancer shaft being arranged one in front of the other in the crankcase;
wherein a pair of power transmission gears for transmitting rotation of the crank shaft to the balancer shaft is arranged between the crankcase and the crankcase cover, the power transmission gears being supported on power transmission gear shafts, respectively;
the balancer shaft has thereon a balancer gear in mesh with one of the power transmission gears, and the crank shaft has thereon a drive gear in mesh with the other of the power transmission gears; and
a fluid pump is provided on one of the power transmission gear shafts supporting the one power transmission gear, to be driven thereby, the fluid pump having an impeller fixed to the one power transmission gear shaft.

2. The power unit according to claim 1,
wherein the one power transmission gear and the balancer gear are arranged to overlap with each other in a vertical direction; and
the other of the power transmission gears is arranged above a line connecting a rotational center of the crank shaft and a rotational center of the one power transmission gear as viewed in a direction of a crank shaft axis line.

3. The power unit according to claim 2,
wherein the one power transmission gear shaft, on which the fluid pump is provided, is rotatable integrally with the one power transmission gear;
a fluid channel is formed in the crankcase, the cylinder body and the cylinder head, to lead a fluid delivered from the fluid pump to a circumferential area of the cylinder in the cylinder body and to the cylinder head;
the fluid channel has a fluid intake port;
the fluid pump has a discharge port; and the discharge port of the fluid pump and the fluid intake port of the fluid channel are arranged to overlap with each other as viewed in the direction of the crank shaft axis line.

4. The power unit according to claim 3,
wherein the power unit includes fastening members joining the crankcase, the cylinder body, and the cylinder head together;
the fluid channel includes a cylinder circumferential channel formed to surround the cylinder and an inflow channel connecting the fluid intake port and the cylinder circumferential channel; and
the inflow channel is connected to the cylinder circumferential channel at a side of an exhaust valve provided for the cylinder, while bypassing or detouring one of the fastening members.

5. The power unit according to claim 4,
wherein the fluid pump is a water pump; and
an oil pump is provided to be driven by the drive gear via a two-stage intermediate gear made up of a first reduction gear and a second reduction gear.

\* \* \* \* \*